No. 745,161. PATENTED NOV. 24, 1903.
C. M. DISSOSWAY.
MEANS FOR DRIVING TRACTION VEHICLES.
APPLICATION FILED SEPT. 2, 1902. RENEWED APR. 14, 1903.
NO MODEL. 2 SHEETS—SHEET 1.
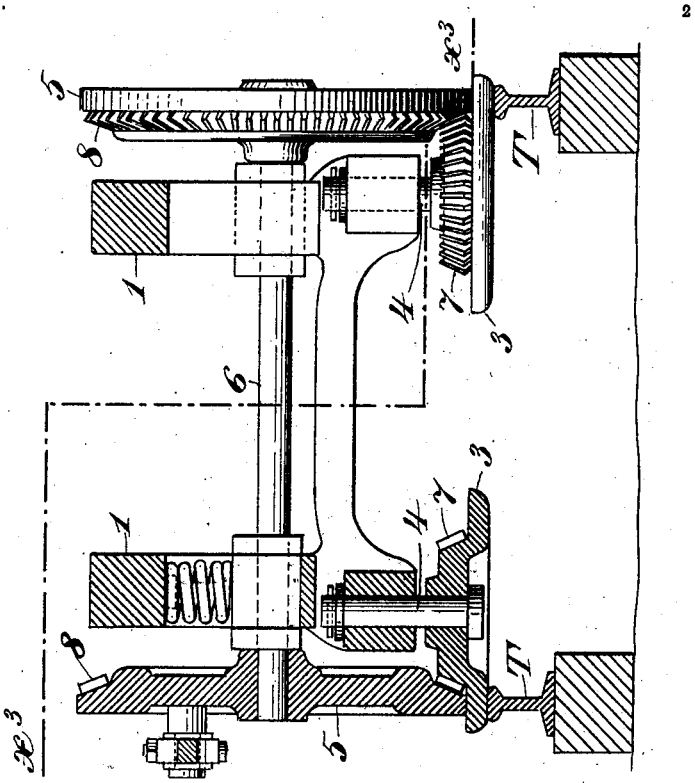
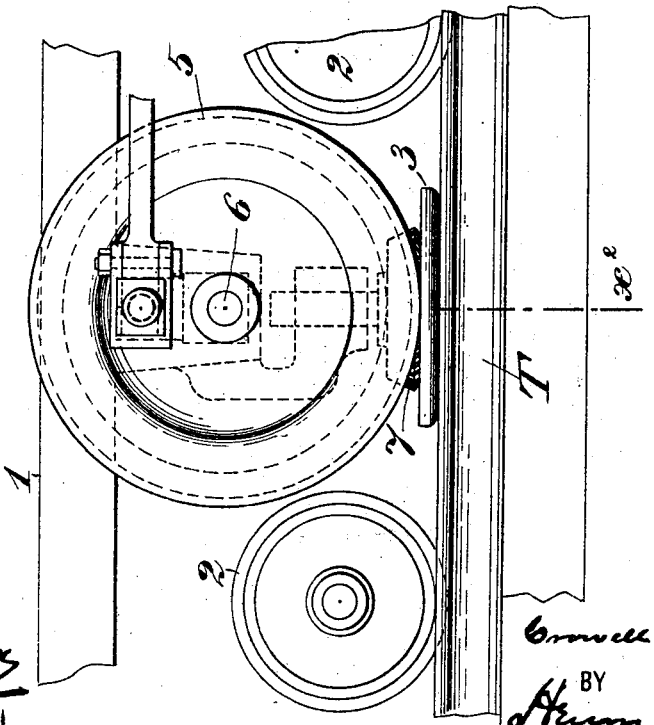
WITNESSES: INVENTOR

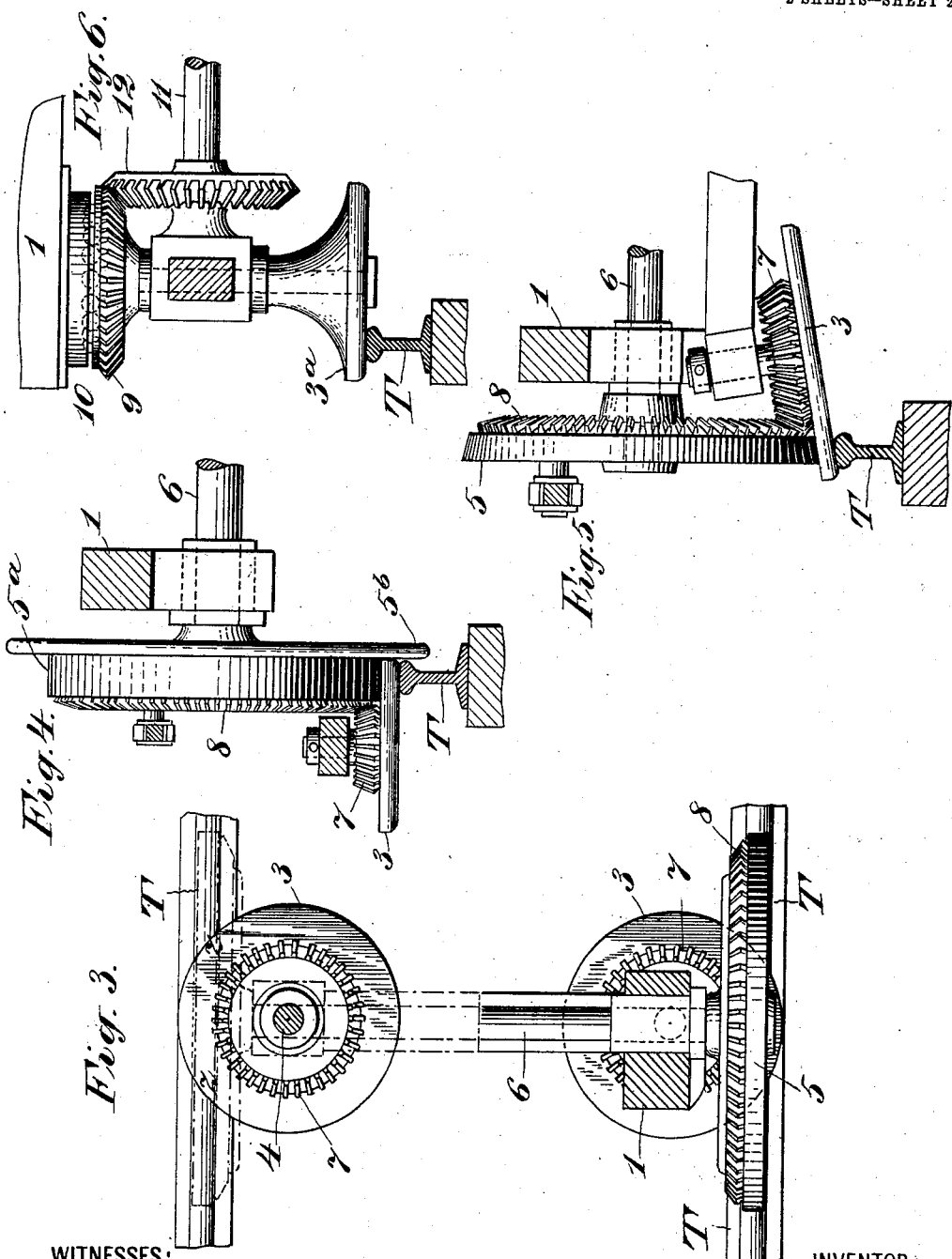

No. 745,161.

Patented November 24, 1903.

UNITED STATES PATENT OFFICE.

CROWELL M. DISSOSWAY, OF NEW YORK, N. Y., ASSIGNOR OF ONE-HALF TO JOHN GOODCHILD, TRUSTEE, OF NEW YORK, N. Y.

MEANS FOR DRIVING TRACTION-VEHICLES.

SPECIFICATION forming part of Letters Patent No. 745,161, dated November 24, 1903.

Application filed September 2, 1902. Renewed April 14, 1903. Serial No. 152,626. (No model.)

*To all whom it may concern:*

Be it known that I, CROWELL M. DISSOSWAY, a citizen of the United States, residing in the borough of Manhattan, city, county, and State of New York, have invented certain new and useful Improvements in Means for Driving Traction-Vehicles, of which the following is a specification.

This invention relates to a traction device for motor-vehicles adapted for running on track-rails, and has for its object to provide a greater extent of driving frictional contact with the crown or upper surface of the rail than is provided by a wheel rolling on the rail and in peripheral contact therewith.

The invention consists, essentially and broadly, in a motor-vehicle provided with flanged wheels to keep it on the track and with a traction driving-wheel which is adapted to bear sidewise or flatwise on some part of the crown of the rail, the plane of the face which bears on the rail being perpendicular to the axis about which the wheel rotates.

The invention also includes means for transmitting some portion of the load or weight of the vehicle to said driving-wheel in order to effect the proper frictional contact for driving.

The invention is applicable to all vehicles which run on tracks and have motors for propelling them through the medium of driving-wheels—such, for example, as locomotives, trolley-cars, and the like.

In the accompanying drawings, which illustrate several embodiments of the invention, Figure 1 is a side elevation of a part of a vehicle provided with my invention. Fig. 2 is a vertical transverse section of the same, the plane of the section being indicated by line $x^2$ in Fig. 1; and Fig. 3 is a sectional plan. In these views the intermediary through which the driving-wheel is rotated also transmits a part of the load to the driver. Fig. 4 is a transverse section illustrating an embodiment where the driver is disposed exterior to the track-rail at one side of the track. Fig. 5 is a transverse section showing the driver inclined to the horizontal. Fig. 6 is a transverse section illustrating an embodiment where the load is transmitted more directly to the driver.

Referring primarily to the first three figures of the drawings, 1 designates in general the frame and body of a motor-vehicle, and 2, Fig. 1, flanged wheels thereof, which run on track-rails T of any kind. 3 is a driving-wheel the side of which is applied laterally to the crown of the rail T. The axle or shaft 4 of the driving-wheel is perpendicular to the plane of the face or side of the wheel 3, which bears on the crown or top surface of the rail. There is a wheel 3 to bear on each track-rail, as seen in Figs. 2 and 3; but as they are alike a minute description of one driver and its appurtenances will suffice. As shown in these figures, and particularly in Fig. 2, there are two bearing-wheels 5 on an axle 6, which rotates in suitable bearings on the vehicle frame or body much in the same way as the axle of the driving-wheels of a locomotive, or, indeed, mounted in any way desired. These wheels will be driven from the power or motor on the vehicle, and they bear on the respective flat driving-wheels 3 and transmit to the latter a part of the load or weight of the vehicle. In these figures the driver 3 is represented as provided with short strong teeth 7, which gear with similar teeth 8 on the bearing-wheel 5. The purpose of these teeth, which are similar to those of bevel-gears, is to compel the bearing-wheel to rotate the driver positively.

It will be noted by reference to Fig. 3 that the face of the driver 3 has an extended surface bearing on the track-rail from $z$ to $z$ much in excess of that which is obtained by an ordinary driving-wheel bearing peripherally on a rail, as in the case of a locomotive-driver, for example, and hence the traction due to the extent of frictional surface in contact and the weight or load will be much greater with the construction described than with the ordinary construction.

The drivers (shown in Figs. 2 and 3) are situated interiorly or between the track-rails and they are horizontally disposed; but they may be exterior to the track-rails, as shown in Fig. 4, and they may be inclined slightly with the horizontal plane of the track, as shown in Fig. 5. If the driver is placed exterior to the track-rail, as shown in Fig. 4, the bearing-wheel $5^a$ may have a flange $5^b$ to engage the rail.

The bearing-wheel as a means of transmitting the load to and imparting rotation to the driver 3 is not an essential. In Fig. 6 a construction is shown wherein the shaft of the driver $3^a$ is extended upward and bears on its upper end a wheel 9, on the face of which the body of the vehicle is supported through the medium of balls 10. The wheels $3^a$ and 9 are both fixed on the shaft and they are driven through any suitable means. For example, on a driving-shaft 11 is a bevel-wheel 12, the teeth on which gear with teeth on the wheel 9.

Obviously the invention may be embodied in various constructions and it is not restricted to any special construction so long as the driving-wheel bears flatwise or sidewise on the rail either in the plane of the track or slightly inclined therewith.

Having thus described my invention, I claim—

1. A motor-vehicle having a driving-wheel with a lateral face, perpendicular to its axis of rotation, adapted to be applied to the crown of the track-rail and intermediate means for transmitting a part of the load to said driving-wheel and rotating the same.

2. A motor-vehicle having a driving-wheel with a lateral face, perpendicular to its axis of rotation, adapted to be applied to the crown of the track-rail, and a bearing-wheel for transmitting a portion of the load to the driving-wheel and for rotating the latter.

3. A motor-vehicle having a driving-wheel with a lateral face, perpendicular to its axis of rotation, adapted to bear on the crown of the track-rail, said wheel having gear-teeth, and an intermediate bearing-wheel which rests peripherally on the driving-wheel and is adapted to transmit a part of the load to the latter, said bearing-wheel having teeth which gear with the teeth on the driver.

4. A motor-vehicle having two driving-wheels with lateral faces perpendicular to the respective axes of the wheels and inclined less than forty-five degrees with the plane of the track, said faces being adapted to bear on the crowns of the respective rails of a track, and intermediate means for rotating said inclined driving-wheels and for transmitting load thereto.

In witness whereof I have hereunto signed my name, this 29th day of August, 1902, in the presence of two subscribing witnesses.

CROWELL M. DISSOSWAY.

Witnesses:
PETER A. ROSS,
WILLIAM J. FIRTH.